United States Patent [19]

Larkin

[11] Patent Number: 4,949,501

[45] Date of Patent: Aug. 21, 1990

[54] FLYING INSECT TRAP

[76] Inventor: Edward F. Larkin, 1169 Outlet Rd., Hallowell, Me. 04347

[21] Appl. No.: 416,616

[22] Filed: Oct. 3, 1989

[51] Int. Cl.$^5$ .............................................. A01M 1/00
[52] U.S. Cl. ...................................................... 43/113
[58] Field of Search ................................. 43/113, 119

[56] References Cited

U.S. PATENT DOCUMENTS

| | | | |
|---|---|---|---|
| 1,159,273 | 11/1915 | Reinhart | 43/119 |
| 1,749,717 | 3/1930 | Palmos | 43/113 |
| 3,023,539 | 3/1962 | Emerson | 43/113 |
| 3,513,585 | 5/1970 | Ross | 43/113 |

Primary Examiner—M. Jordan
Attorney, Agent, or Firm—Fish & Richardson

[57] ABSTRACT

In accordance with the invention there is provided an insect trap of the type which employs light and desirably odor to attract flying insects, especially common house flies. It comprises a light and tray-holding housing which is generally oblong in shape defined by bottom, upstanding side walls and a base member. This housing is open at the top and has its side walls provided with a pair of internal longitudinally extending mutually facing grooves. A mounting member is hinged to the base member, permitting the housing to swing approximately 180° from an open position wherein the housing is located substantially in the plane of the base member to another position wherein the members are folded against each other. An insect attracting light is mounted within the housing and a tray carrying insect trapping material on its surface is removably carried in the grooves. Thus, when the trap is mounted on a wall or the like the light and tray-holding housing may be swung between a light exposing position and light hiding position spaced from the wall surface, the tray being readily removable and replaceable for cleaning purposes.

3 Claims, 4 Drawing Sheets

FLYING INSECT TRAP

This invention relates to flying insect traps and provides a new, improved and aesthetic trap employing light to attract the insects, which is adjustable between two modes of operation and whose insect trapping medium is easily replaceable.

BACKGROUND OF THE INVENTION

Over the years, numerous flying insect traps have been proposed. Most employ light to attract the flies and a sticky medium to trap them. One of the earliest is disclosed in U.S. Pat. No. 1,461,169, issued in 1923. It provides a sheet of fly paper mounted on a bracket attachable to an electric light bulb suspended from the ceiling with the bulb located in front of the sticky side of the paper. A more sophisticated approach is shown in Japanese Utility Model Report 50(1975)-35778 dated Apr. 15, 1975, wherein a fluorescent light is mounted beneath a panel and above a horizontal rod from which a ribbon of fly paper is hung lengthwise. Apparently the panel is intended to be mounted against a ceiling or other horizontal surface. Still other fly traps are slotted boxes with interior lights containing insect catching bodies, e.g. U.S. Pat. Nos. 1,749,717 and 3,023,539; boxes containing blowers to blow the light-attracted insects into an enclosure e.g., U.S. Pat. Nos. 2,806,321 and 3,152,420; traps employing heat lamps to stun the insects with provision for suffocating the stunned victims, e.g. U.S. Pat. No. 3,059,373. Still others are of the type which electrocute the bugs, e.g. U.S. Pat. No. 3,894,351 and U.S. Pat. No. Des. 225,630, or which attract the bugs by both light and odor, e.g. U.S. Pat. No. 4,127,961. Most have a removable dead insect holder, e.g. U.S. Pat. No. 4,074,457.

The present invention is of the light attracting variety, provides a readily replaceable sanitary, sticky insect trapping medium and is readily adjustable from a configuration attractively displaying only indirect light to one completely exposing the light source for use when aesthetics are not important, as after hours in a restaurant.

SUMMARY OF THE INVENTION

In accordance with the invention there is provided an insect trap of the type which employs light and desirably odor to attract flying insects, especially common house flies. It comprises a light and tray-holding housing which is generally oblong in shape defined by bottom, upstanding side walls and a base member. This housing is open at the top and has its side walls provided with a pair of internal longitudinally extending mutually facing grooves. A mounting member is hinged to the base member, permitting the housing to swing approximately 180° from an open position wherein the housing is located substantially in the plane of the base member to another position wherein the members are folded against each other. An insect attracting light is mounted within the housing and a tray carrying insect trapping material on its surface is removably carried in the grooves. Thus, when the trap is mounted on a wall or the like the light and tray-holding housing may be swung between a light exposing position and light hiding position spaced from the wall surface, the tray being readily removable and replaceable for cleaning purposes.

In preferred embodiments, the light is a U-shaped fluorescent and is located within a plane wholly within the housing and the insect trapping material contains a non-toxic synthetic pheromone.

Still further objects, features and advantages of the invention will become apparent from the following description of a presently preferred embodiment thereof taken in conjunction with the accompanying drawings.

BRIEF DESCRIPTION OF THE DRAWINGS

FIG. 1A is a perspective view of the preferred U-shaped fluorescent tube which comprises the light source;

DETAILED DESCRIPTION OF THE PREFERRED EMBODIMENT

Figure 1:
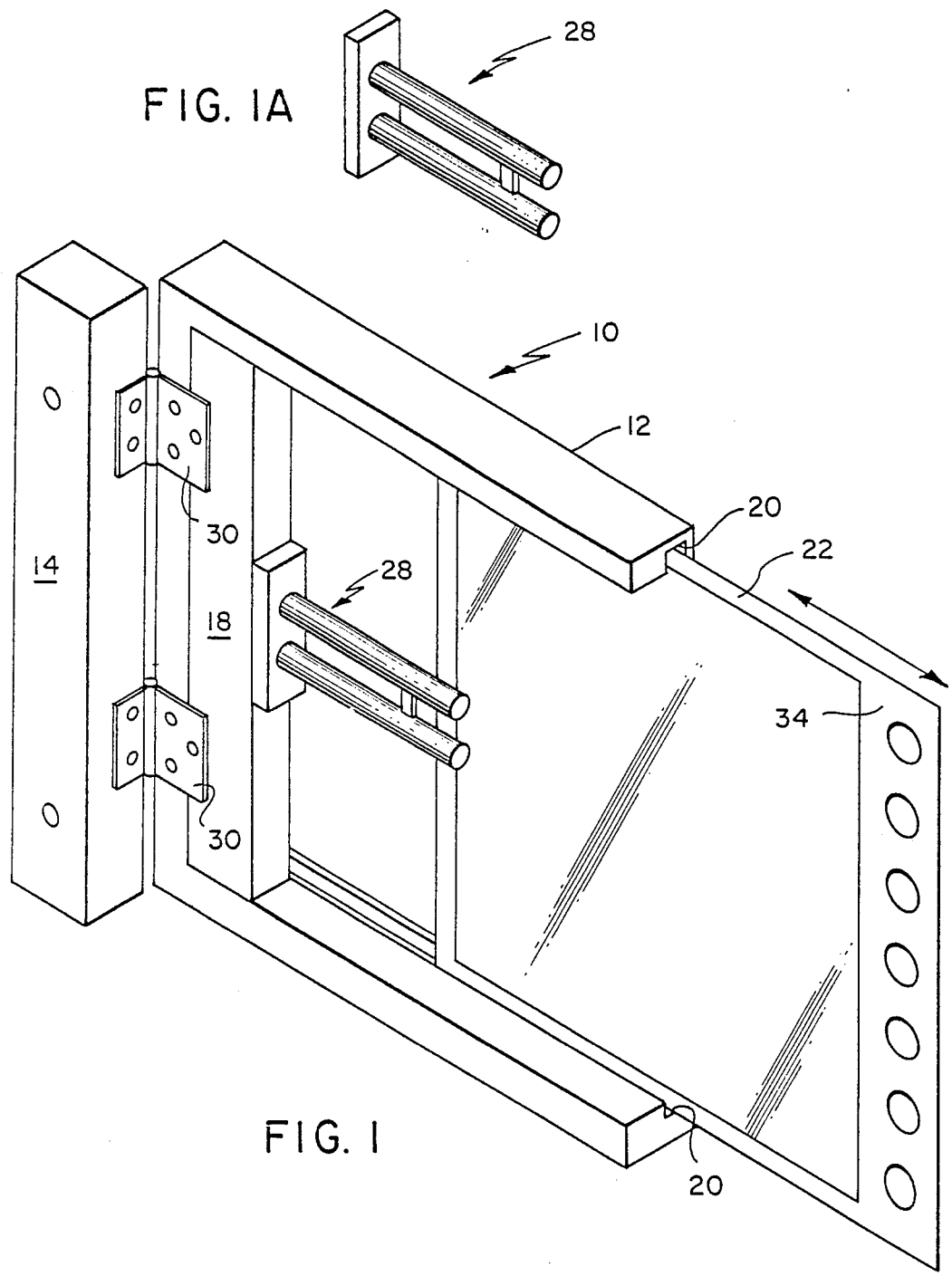
FIG. 1 is a view in perspective of the novel insect trap showing the position of the insect attracting light source and the removable insect catching tray partially installed.

The presently preferred embodiment 10 of the invention comprises a light and tray-holding body or housing 12 within which U-shaped fluorescent light 28 is mounted on base panel 18. Hinged to base panel 18 of the housing by hinges 30 is a mounting member 14 by means of which the device can be attached to a wall 32 or the like (FIG. 3).

Figure 2:
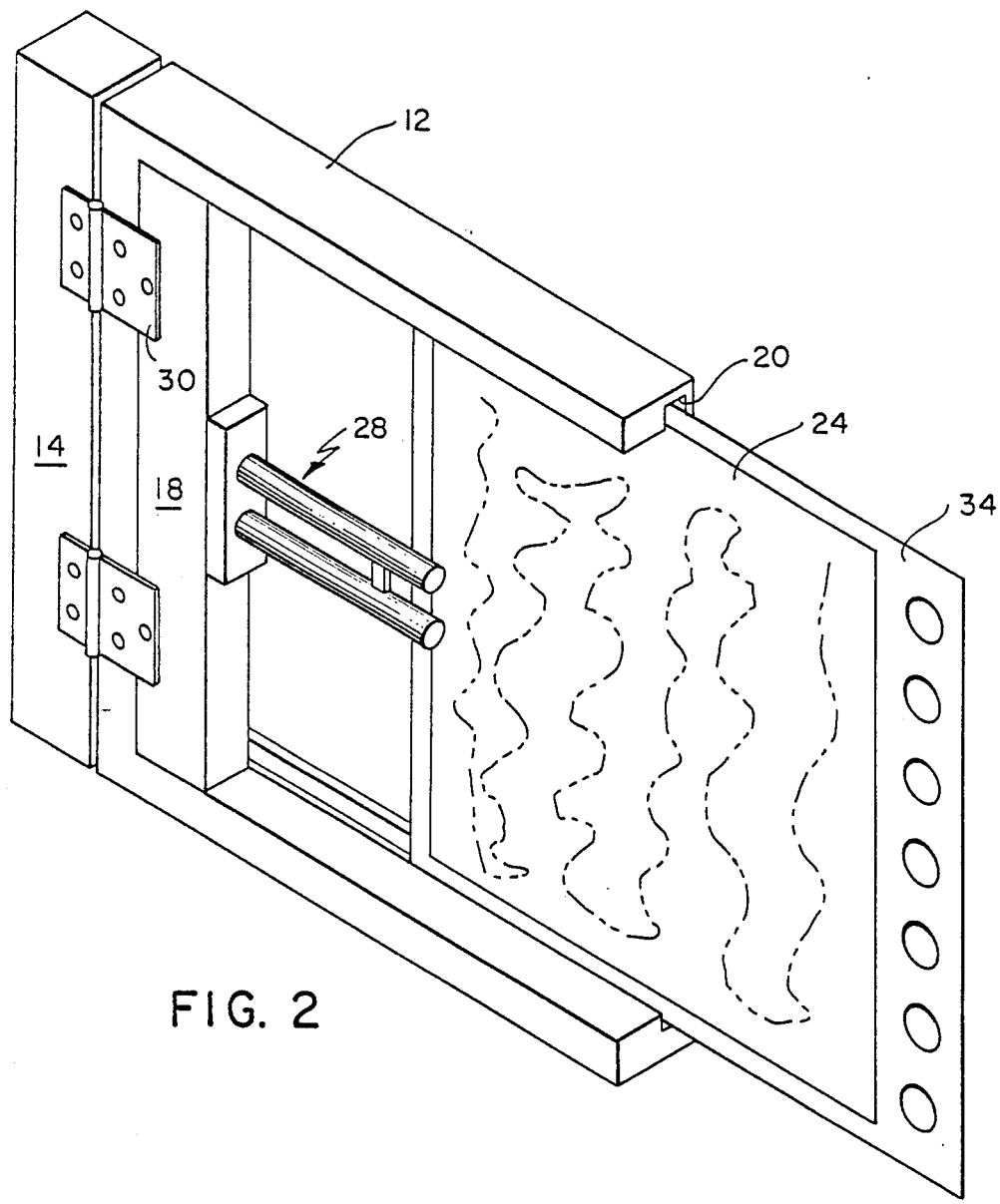
FIG. 2 is a view similar to FIG. 1 but with the light and tray-holding body folded to complete light-exposing position and the presence of sticky fly trapping material indicated on the surface of the tray.

The housing 12 has mutually facing grooves 20 cut into the walls 12 for the purpose of slidingly receiving the tray 22. The tray, therefore, is slidably held for easy insertion and removal. The tray may carry a removable sheet of sticky, insect trapping material 24 (FIG. 2) or, alternatively, the tray 22 itself may be of a throw-away type and carry on its upper surface the fly trapping substance. The slide 22 may be held in place if necessary by any suitable means, e.g. Velcro ® fastener or any suitable mechanical lock or catch mechanism (not shown). The slides are provided with a handling portion 34 for manual gripping by the user for removing from and installing in the housing in a sanitary manner.

The wall mounting member 14 is provided with screw holes 26 facilitating the attachment of the entire device to the wall 32 or other surface. It will be understood that the trap may be mounted in any suitable manner and that the use of screws is just one option. One form of mounting could be the use of a Velcro ® fastener. Likewise, the electrical connections may be of any suitable type. Hence, none have been shown. For example, the member 14 could be installed over or adjacent a wall receptacle which in turn could be energized from a remote switch or, alternatively, a switch could be installed directly on the unit.

Figure 3:
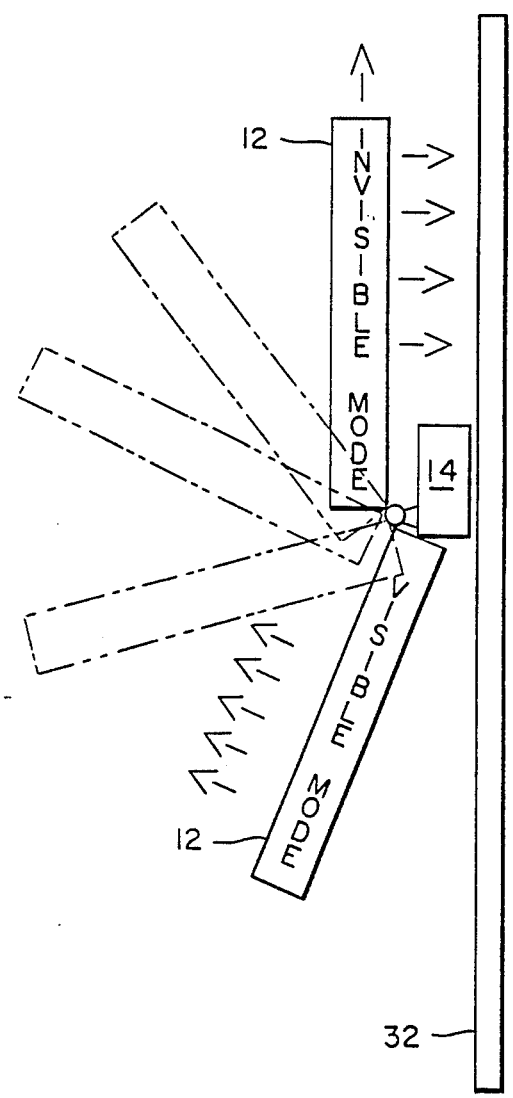
FIG. 3 is a somewhat diagrammatic side view of the device showing the swinging of the light and tray-holding body between its two positions.
Figure 4:
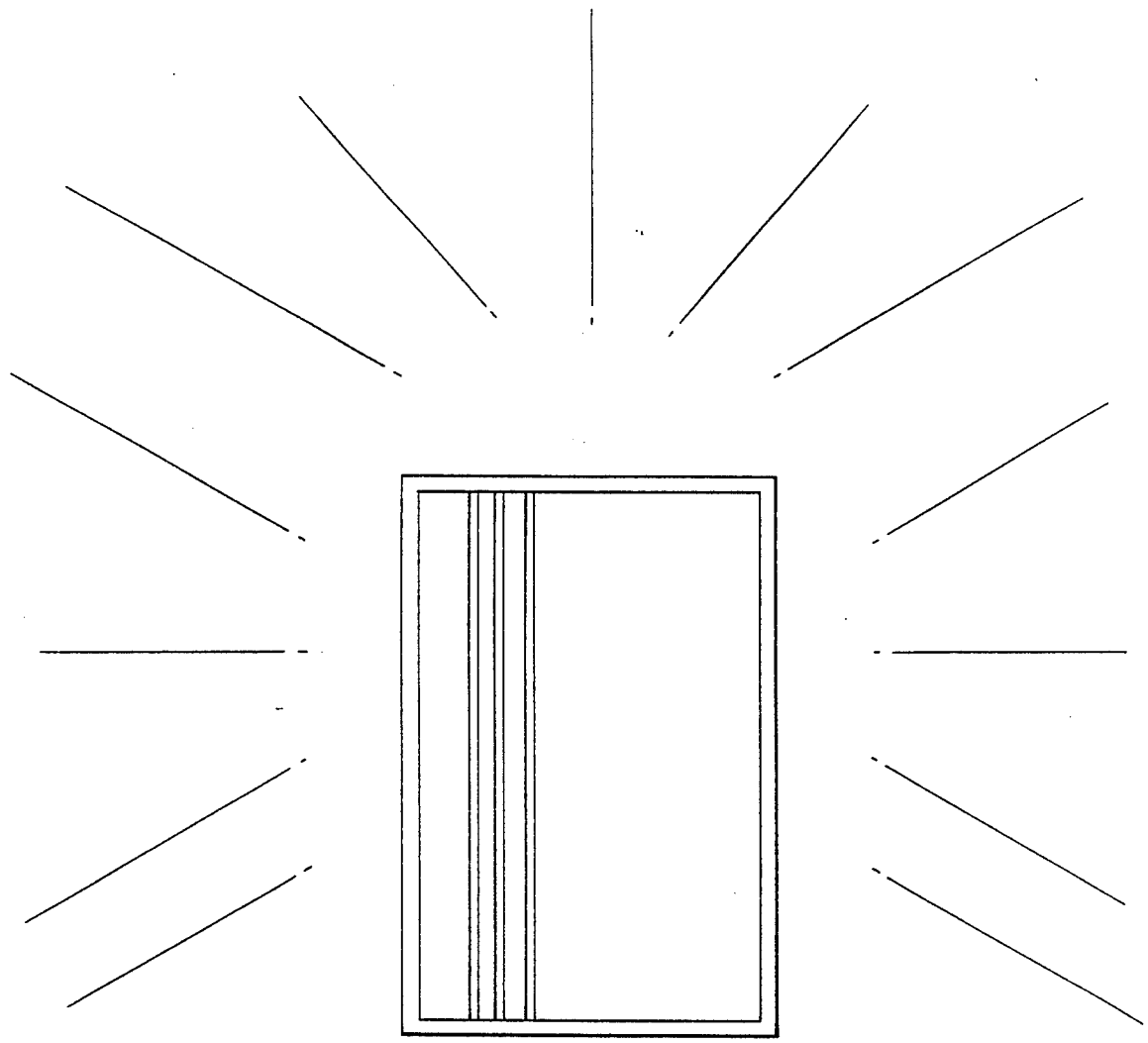
FIG. 4 is a front view of the device as mounted on a wall with the light and tray-holding body swung to its closed position spaced from the wall but concealing the light source from direct view.

It will be seen from FIG. 3 that, when the device is wall or ceiling mounted, the light and tray holder may be swung between a light visible mode (to the left as seen in FIG. 3) and an invisible mode (to the right as seen in FIG. 3). In the former position the illuminated tube 28 is openly displayed so as to light the surroundings as desired and most effectively to attract flying insects. This mode is aesthetically the less attractive, but perhaps the more functional of the two. In the latter position, the holder 12 is spaced from and parallel to the wall 32 so as to provide only an aesthetically attractive non-distracting fly attracting glow spreading 360° around the unit. This portion of the wall is thus indirectly lighted while in this configuration, the tray and wall define an illuminated filter chamber from which the attracted insects never come out but which is not visible to casual viewers, such as patrons of a restaurant. This convertible feature makes the device attractive for use in restaurants and other facilities which are closed after hours. During working hours the invisible mode is employed but after hours the visible mode may be used. If it is not desired to use the visible mode after hours, use in the invisible mode provides subdued, attractive security night lighting for the establishment.

The insect trapping material 24 may be of any conventional type and the effectiveness of the light to attract bugs can be enhanced by the use of suitable odor producing materials as known in the art. One suitable material for use on the fly entrapping filter is a non-toxic synthetic pheromone which acts as a fly sex-lure improving the unit's ability to attract house flies and garbage flies. This substance is odorless, nontoxic and E.P.A. approved.

The fly trap according to the invention has numerous advantageous features. It has the ability to attract all types of flying insects (gnats, mosquitos, minges, fruitflies, blackflies, etc.). The coated filters themselves may be made of very inexpensive material such as cardboard so that they may be of the throwaway type. They can be readily slipped into and out of the housing and can be handled in a sanitary manner since the gripping portion 34 extends well away from the fly trapping portion. The trapped insects are hidden from view when the unit is adjusted to its "invisible" or closed mode, thereby increasing the aesthetic appeal for use in public places. The unit operates silently and effectively twenty-four hours a day, gives off no detectable odor and is safe to use, being non-toxic to pets or humans. It runs economically on house current and is easy to maintain, the only replacement parts being the filter slide and the fluorescent bulb.

While there has herein been disclosed and described a presently preferred embodiment of the invention it will nevertheless be understood that the same is capable of modification and change by those skilled in the art and it is intended that the scope of the invention be limited only by the proper interpretation to be afforded the appended claims.

I claim:

1. An insect trap of the type which employs light to attract flying insects comprising
    a light and tray-holding housing generally oblong in shape defined by bottom, upstanding side walls and a base member,
        said housing being open at the top and having its side walls provided with a pair of internal longitudinally extending mutually facing grooves,
    a mounting member hinged to said base member permitting said housing to swing approximately 180° from an open position wherein said housing is located substantially in the plane of said base member to another position wherein said members are folded against each other,
    an insect attracting light mounted within said housing, and
    a tray carrying insect trapping material on its surface removably carried in said grooves,
    whereby when said trap is mounted on a wall or the like the light and tray-holding housing may be swung between a light exposing position and light hiding position spaced from the wall surface, said tray being readily removable and replaceable for cleaning purposes.

2. The trap of claim 1 wherein said light is a U-shaped fluorescent and is located within a plane wholly within said housing.

3. The trap of claim 1 wherein said insect trapping material contains a non-toxic synthetic pheromone.

* * * * *